US009747007B2

(12) United States Patent
Khanahmadi

(10) Patent No.: US 9,747,007 B2
(45) Date of Patent: Aug. 29, 2017

(54) RESIZING TECHNIQUE FOR DISPLAY CONTENT

(71) Applicant: Microsoft Corporation, Redmond, WA (US)

(72) Inventor: Saied Khanahmadi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 408 days.

(21) Appl. No.: 14/083,992

(22) Filed: Nov. 19, 2013

(65) Prior Publication Data

US 2015/0143287 A1 May 21, 2015

(51) Int. Cl.
*G06F 3/048* (2013.01)
*G06F 3/0484* (2013.01)

(52) U.S. Cl.
CPC ........ *G06F 3/0484* (2013.01); *G06F 3/04847* (2013.01); *G06F 2203/04806* (2013.01)

(58) Field of Classification Search
CPC .................................................. G06F 2217/08
See application file for complete search history.

(56) References Cited

U.S. PATENT DOCUMENTS

| 7,916,157 | B1 | 3/2011 | Kelley et al. | |
| 8,648,858 | B1* | 2/2014 | Swenson | G06T 9/00 345/428 |
| 2003/0164861 | A1 | 9/2003 | Barbanson et al. | |
| 2009/0109243 | A1* | 4/2009 | Kraft | G06F 3/0481 345/660 |
| 2011/0072390 | A1 | 3/2011 | Duga et al. | |
| 2012/0293509 | A1* | 11/2012 | Barnsley | G06T 9/00 345/419 |
| 2013/0027614 | A1 | 1/2013 | Bayer et al. | |
| 2013/0106907 | A1 | 5/2013 | Davis et al. | |
| 2014/0368549 | A1* | 12/2014 | Lin | G06T 3/40 345/660 |

FOREIGN PATENT DOCUMENTS

WO 2009053833 A1 4/2009

OTHER PUBLICATIONS

International Search Report & Written Opinion for PCT Patent Application No. PCT/US2014/066020, Mail Date: Feb. 5, 2015, 9 Pages.

(Continued)

*Primary Examiner* — William Bashore
*Assistant Examiner* — Rayeez Chowdhury
(74) *Attorney, Agent, or Firm* — Fiala & Weaver P.L.L.C.

(57) ABSTRACT

Systems, methods, apparatuses, and computer program products for resizing content to be rendered to a display are described. In accordance with embodiments, content items such as text items and images are enlarged based on an original size associated therewith and a scale factor. The enlargement is carried out in a manner such that smaller content items are enlarged as the scale factor increases at a faster rate than a rate at which relatively larger content items are enlarged as the scale factor increases. In a further embodiment, the enlargement is performed in such a manner that the size of smaller content items after enlargement will never equal or exceed the size of relatively larger content items after enlargement.

20 Claims, 12 Drawing Sheets

(56) References Cited

OTHER PUBLICATIONS

"Automatic Scaling in Windows Forms", retrieved from <http://msdn.microsoft.com/en-us/library/ms229605.aspx>, retrieved: Jul. 5, 2013, published on Aug. 30, 2008, 5 pages.

Deryckere, "Relative font sizes on the iPhone: conversion to absolute sizes", retrieved from <http://www.eldeto.com/content/relative-font-sizes-iphone-conversion-absolute-sizes-0>, retrieved: Jul. 5, 2013, published on Dec. 20, 2010, 2 pages.

Dudler, "Should a Web Designer Care About Relative Font Sizes? Absolutely", retrieved from < http://frontify.com/blog/relative-font-sizes-for-web-designers/>, retrieved: Jul. 5, 2013, 4 pages.

"International Preliminary Report on Patentability Issued in PCT Application No. PCT/US2014/066020", Mailed Date: Mar. 11, 2016, 8 Pages.

Second Written Opinion Issued in PCT Patent Application No. PCT/US2014/066020, Mail Date: Dec. 14, 2015, 7 Pages.

\* cited by examiner

RESIZING TECHNIQUE FOR DISPLAY CONTENT

BACKGROUND

Text enlargement refers to a feature provided by some computers and mobile devices that, when activated, causes text and other display content (e.g., icons) to appear larger without having to change the resolution of the display to which such content is rendered. Text enlargement is generally considered an important accessibility feature as it can be used by people with visual impairments to better enable them to access content displayed by their computers and mobile devices. Text enlargement also provides users with flexibility by enabling them to select their own preferred display size for text.

SUMMARY

Systems, methods, apparatuses, devices, and computer program products for resizing content to be rendered to a display are described herein. In accordance with embodiments, content items such as text items and images are enlarged based on an original size associated therewith and a scale factor. The enlargement is carried out in a manner such that smaller content items are enlarged as the scale factor increases at a faster rate than a rate at which relatively larger content items are enlarged as the scale factor increases. This approach can improve accessibility by applying a greater degree of enlargement to those content items which are smallest and hardest to read, while improving usability by applying a lesser degree of enlargement to larger content items that may already be sufficiently legible, thereby freeing up more of a display area for other content and functionality a user may wish to access. In a further embodiment, the enlargement is performed in such a manner that the size of smaller content items after enlargement will never equal or exceed the size of relatively larger content items after enlargement. By preserving a size difference between smaller and larger content items even after enlargement has been applied, usability of applications that utilize the size of content itself to convey information can be maintained.

Embodiments described herein may also perform content reduction. In particular, embodiments described herein may perform content reduction in manner such that larger content items are reduced in size at a faster rate as a scale factor decreases than a rate at which relatively smaller content items are reduced in size as the scale factor decreases. Furthermore, embodiments described herein may perform content reduction in such a manner that the size of larger content items after reduction will never equal or be less than the size of relatively smaller content items after reduction.

In particular, an apparatus is described herein. The apparatus includes at least one processor and a memory that stores computer program logic for execution by the at least one processor. The computer program logic includes a plurality of components configured to perform operations when executed by the at least one processor. The plurality of components include a content providing component, a content resizing component, and a display component. The content providing component is configured to provide a first content item and a second content item to be rendered to a display. The content resizing component is configured to increase a respective size associated with each of the first content item and the second content item as a scale factor increases. The first content item has a different size than the second content item. The increase is performed such that the size associated with a smaller of the first and second content items increases with the scale factor at a rate that is faster than a rate at which the size associated with a larger of the first and second content items increases with the scale factor. The display component causes the first content item and the second content items to be displayed at the increased sizes respectively associated therewith. The first content item and the second content item may comprise, for example, two text items, two images, or a text item and an image respectively.

In an embodiment, the plurality of components further include a user interface component that is configured to enable a user of the apparatus to select the scale factor. In further accordance with such an embodiment, the user interface component may be configured to display an interactive slider by which a user of the apparatus can select the scale factor.

In an alternate embodiment, the plurality of components further includes a scale factor selection component that is configured to automatically select the scale factor. Such selection may be made based on one or more parameters, such as one or more of a display size, a display resolution, a device operating mode, a user viewing location or orientation, a device manufacturer, and a device model.

In one embodiment, the content providing component comprises part of an application stored in the memory. In a further embodiment, the content resizing component comprises part of an operating system stored in the memory.

In another embodiment, the content resizing component is accessible to other components via an application programming interface (API). The API may include, for example, a function that receives a size associated with a content item and returns an adjusted size for the content item. The API may also include a function that indicates whether a content resizing feature is active or inactive.

In yet another embodiment, the content resizing component is further configured to reduce a respective size associated with each of the first content item and the second content item as the scale factor decreases. The decreasing is performed such that the size associated with the smaller of the first and second content items decreases with the scale factor at a rate that is slower than a rate at which the size associated with a larger of the first and second content items decreases with the scale factor.

In a still further embodiment, the content resizing component is configured to operate in an alternate mode in which the content resizing component increases a respective size associated with each of the first content item and the second content item as the scale factor increases, the increase being performed such that the size associated with the smaller of the first and second content items increases with the scale factor at a rate that is equal to a rate at which the size associated with a larger of the first and second content items increases with the scale factor.

A method for performing content resizing is also described herein. In accordance with the method, an original size associated with a first content item and an original size associated with a second content item are received. The original size associated with the second content item is different than the original size associated with the first content item. An enlargement amount is calculated for each of the first content item and the second content item by utilizing a function of the original size associated with the respective content item and a scale factor. The function is defined such that the enlargement amount for the smaller of the first and second content items increases with the scale factor at a rate that is faster than a rate at which the enlargement amount for the larger of the first and second content items increases with the scale factor. The enlargement amount for the first content item is added to the original size associated with the first content item to produce an output size associated with the first content item. The enlargement amount for the second content item is added to the original size associated with the second content item to produce an output size associated with the second content item. The first content item is displayed at the output size associated with the first content item. The second content item is displayed at the output size associated with the second content item. The first content item and the second content item may comprise, for example, two text items, two images, or a text item and an image respectively.

In one embodiment of the method, the enlargement amount for each of the first and second content items is calculated in accordance with $$MAX(-e*\ln(\text{original\_size})+18, 0)*(\text{scale\_factor}-1)$$

wherein original_size represents the original size of the first or second content item respectively and scale_factor represents the scale factor.

In another embodiment, the method further includes selecting the scale factor based on user input. In an alternate embodiment, the method further includes selecting the scale factor based on one or more parameters. The one or more parameters may include one or more of a display size, a display resolution, a device operating mode, a user viewing location or orientation, a device manufacturer, and a device model.

A computer program product is also described herein. The computer program product comprises a computer-readable memory device having instructions recorded thereon that, when executed by one or more processors, cause the one or more processors to perform operations. In accordance with such operations, a scale factor is received. An original size associated with a content item to be displayed is also received. An enlargement amount is then calculated as a function of the scale factor and the original size. The function is defined such that, for a fixed scale factor, the enlargement amount decreases as the original size increases. The enlargement amount is then added to the original size thereby to produce an output size. The content item is then caused to be displayed at the output size. The content item may comprise, for example, a text item or an image. In one embodiment, calculating the enlargement amount includes calculating the enlargement amount as a function of the scale factor and a natural logarithm of the original size.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 3C:
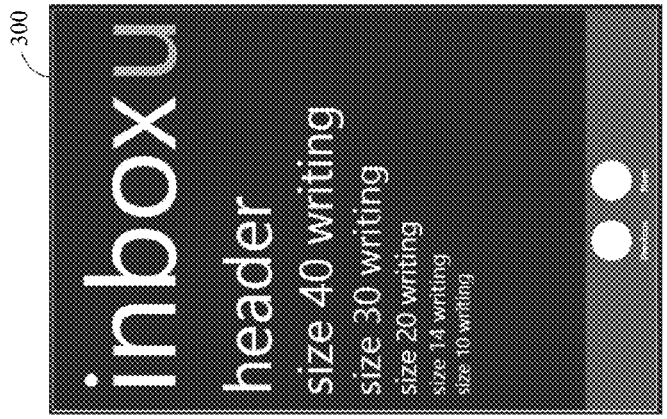
Figure 3B:
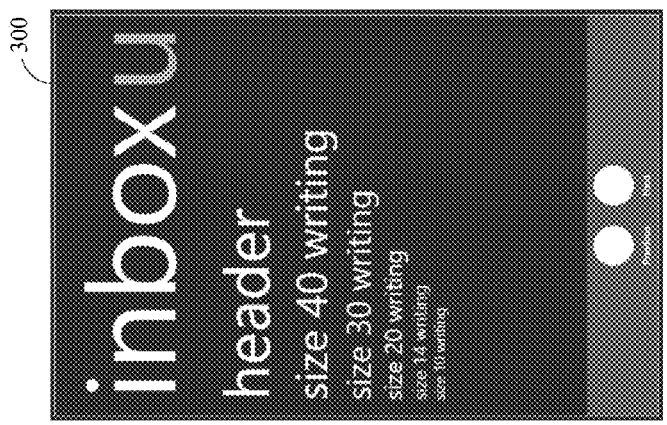
Figure 3A:
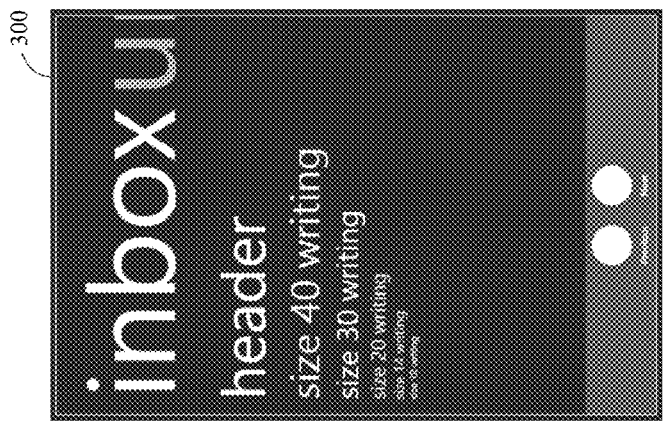

FIGS. 3A, 3B and 3C collectively provide a first example of how text that has been enlarged using a content resizing technique in accordance with an embodiment appears on the display of a smart phone.

Figure 4C:
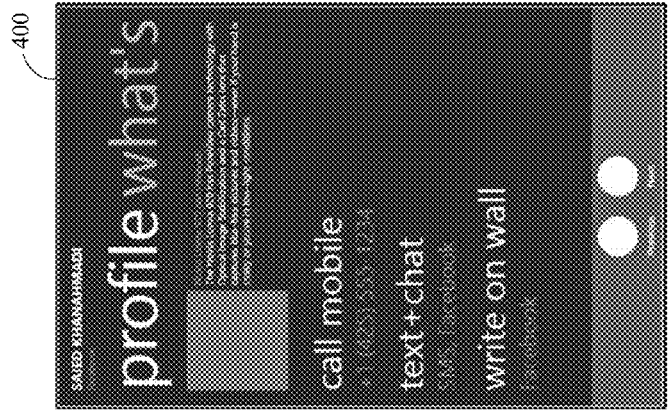
Figure 4B:
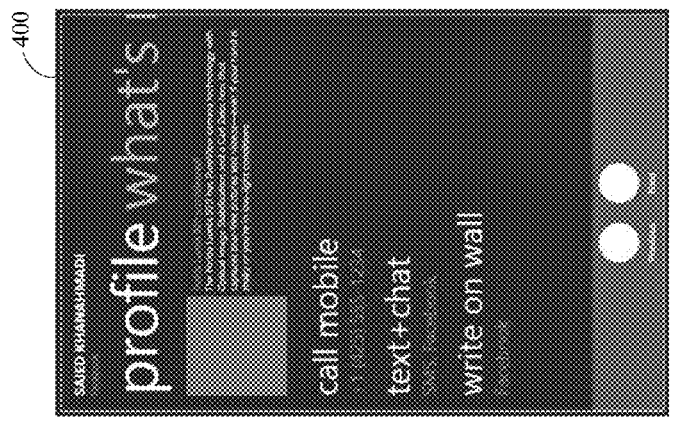
Figure 4A:
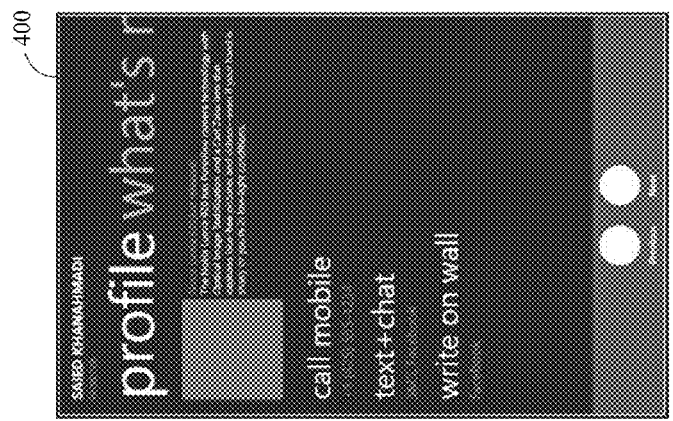

FIGS. 4A, 4B and 4C collectively provide a second example of how text that has been enlarged using a content resizing technique in accordance with an embodiment appears on the display of a smart phone.

Figure 5A:
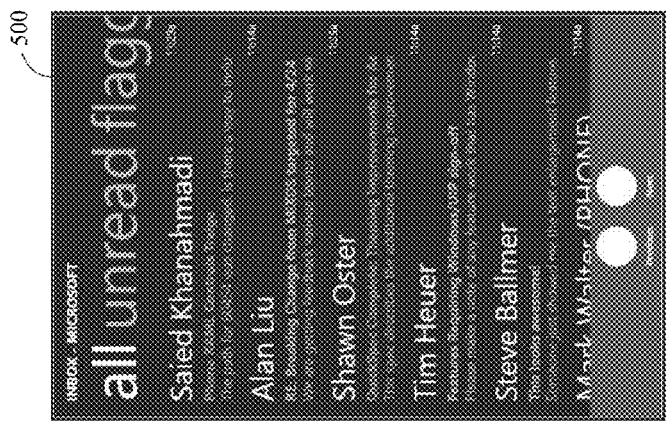
Figure 5B:
Figure 5C:
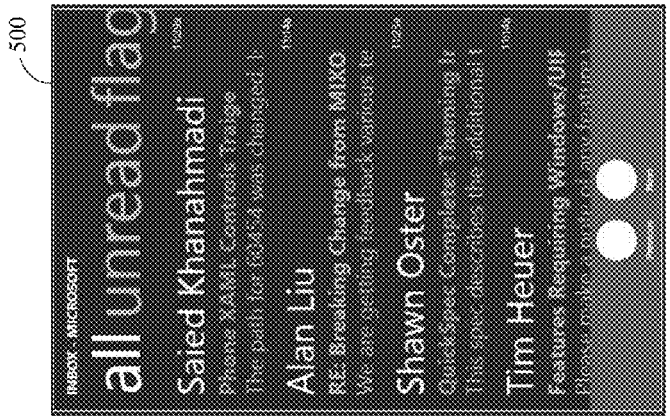

FIGS. 5A, 5B and 5C collectively provide a third example of how text that has been enlarged in accordance with a content resizing technique in accordance with an embodiment appears on the display of a smart phone.

Figure 6:
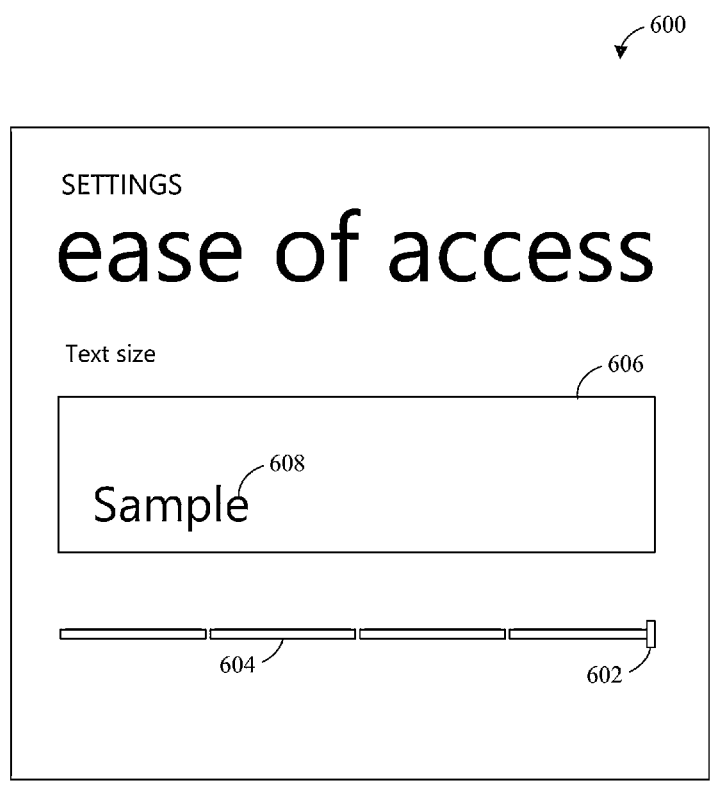

FIG. 6 depicts an example user interface that may be used to select a scale factor for content resizing in accordance with an embodiment.

Figure 7:
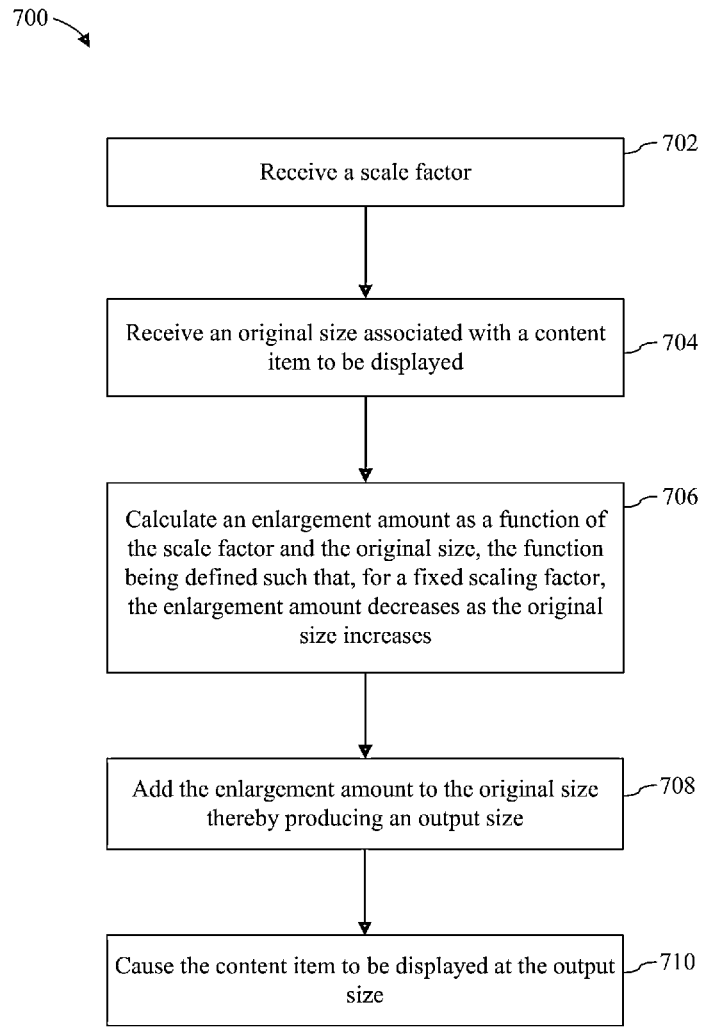

FIG. 7 depicts a flowchart of a method for enlarging a content item to be rendered to a display in accordance with an embodiment.

Figure 8:
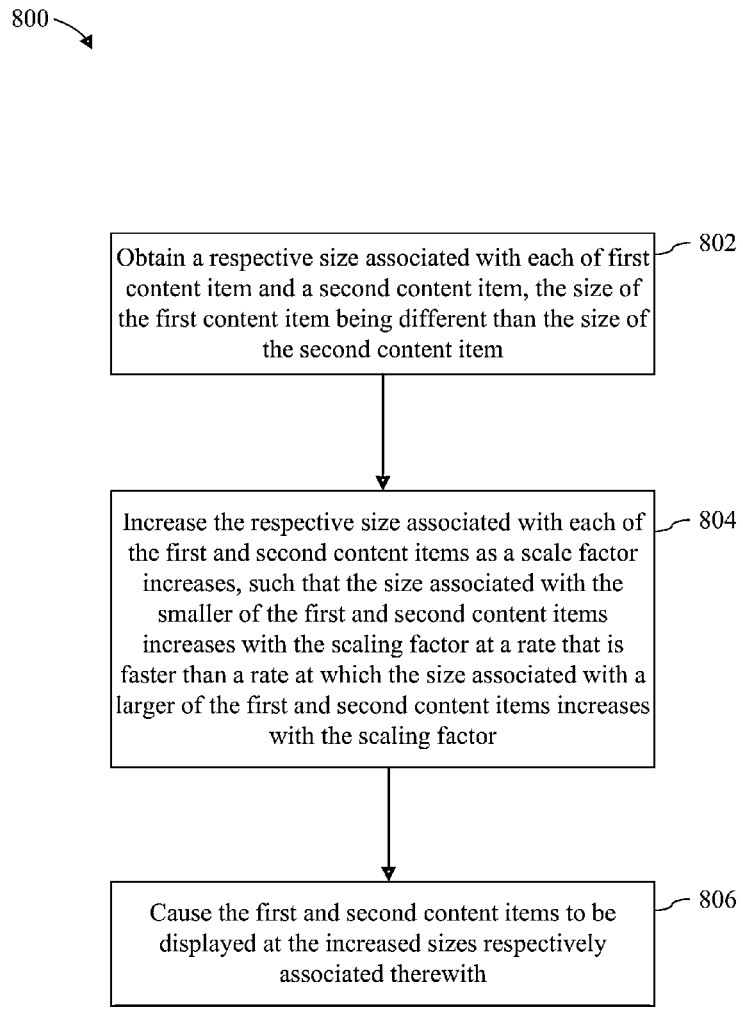

FIG. 8 depicts a flowchart of a method for enlarging first and second content items to be rendered to a display in accordance with an embodiment.

Figure 9:
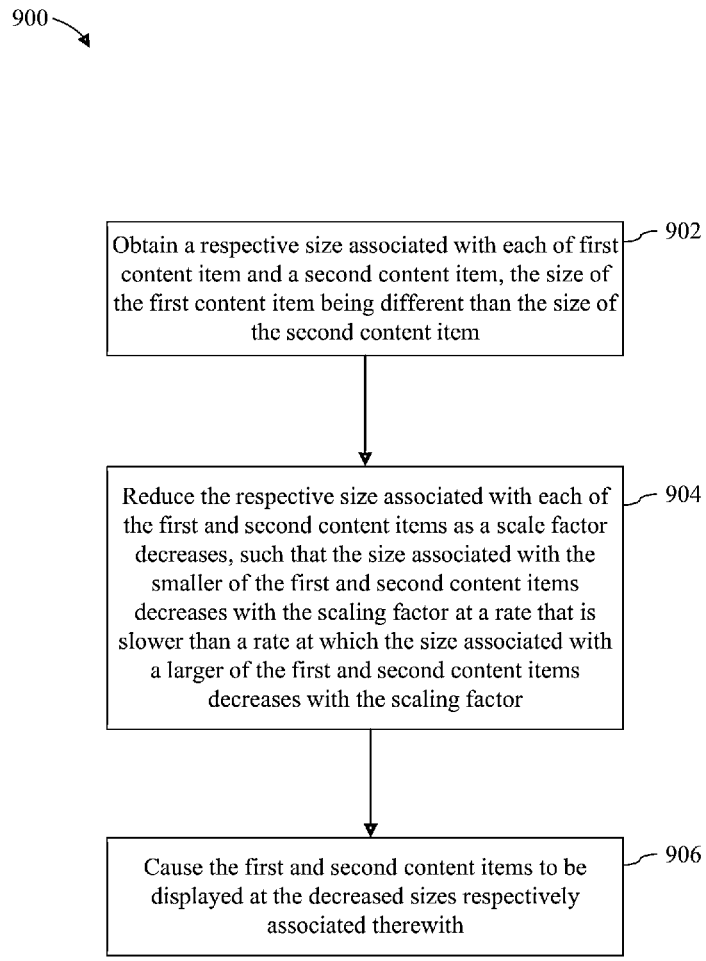

FIG. 9 depicts a flowchart of a method for reducing first and second content items to be rendered to a display in accordance with an embodiment.

Figure 10:
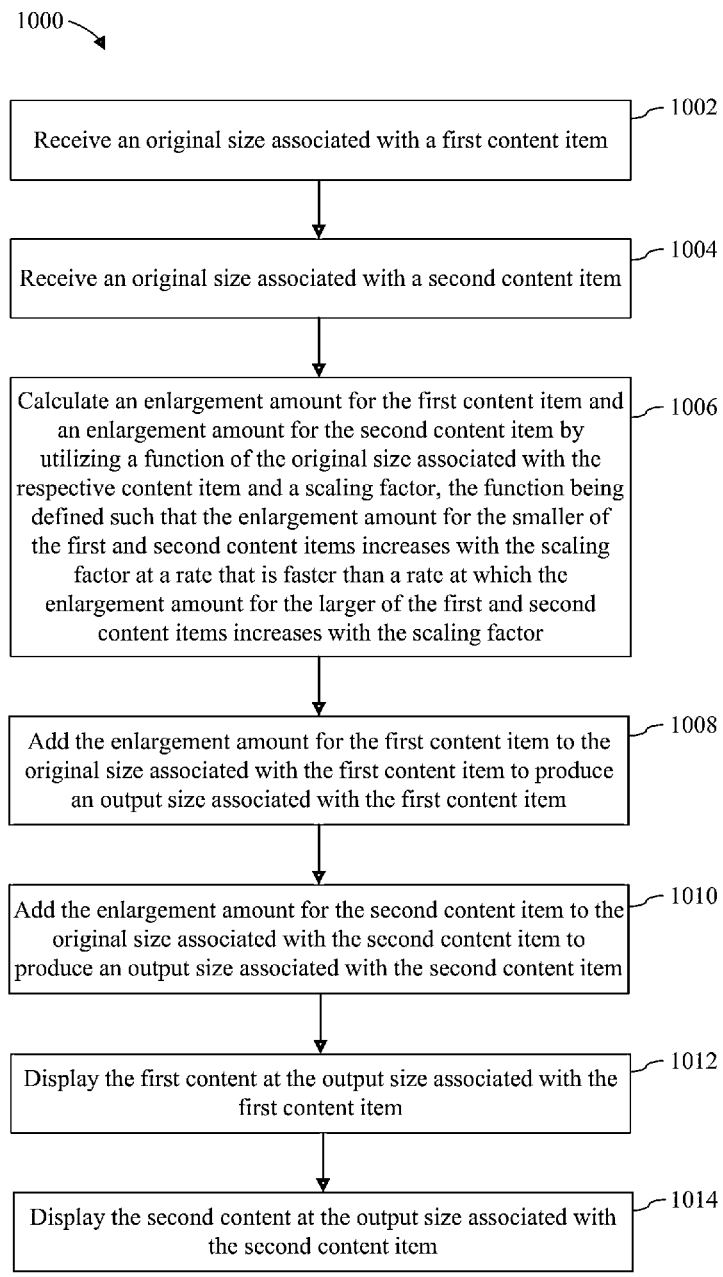

FIG. 10 depicts a flowchart of another method for enlarging first and second content items to be rendered to a display in accordance with an embodiment.

Figure 11:
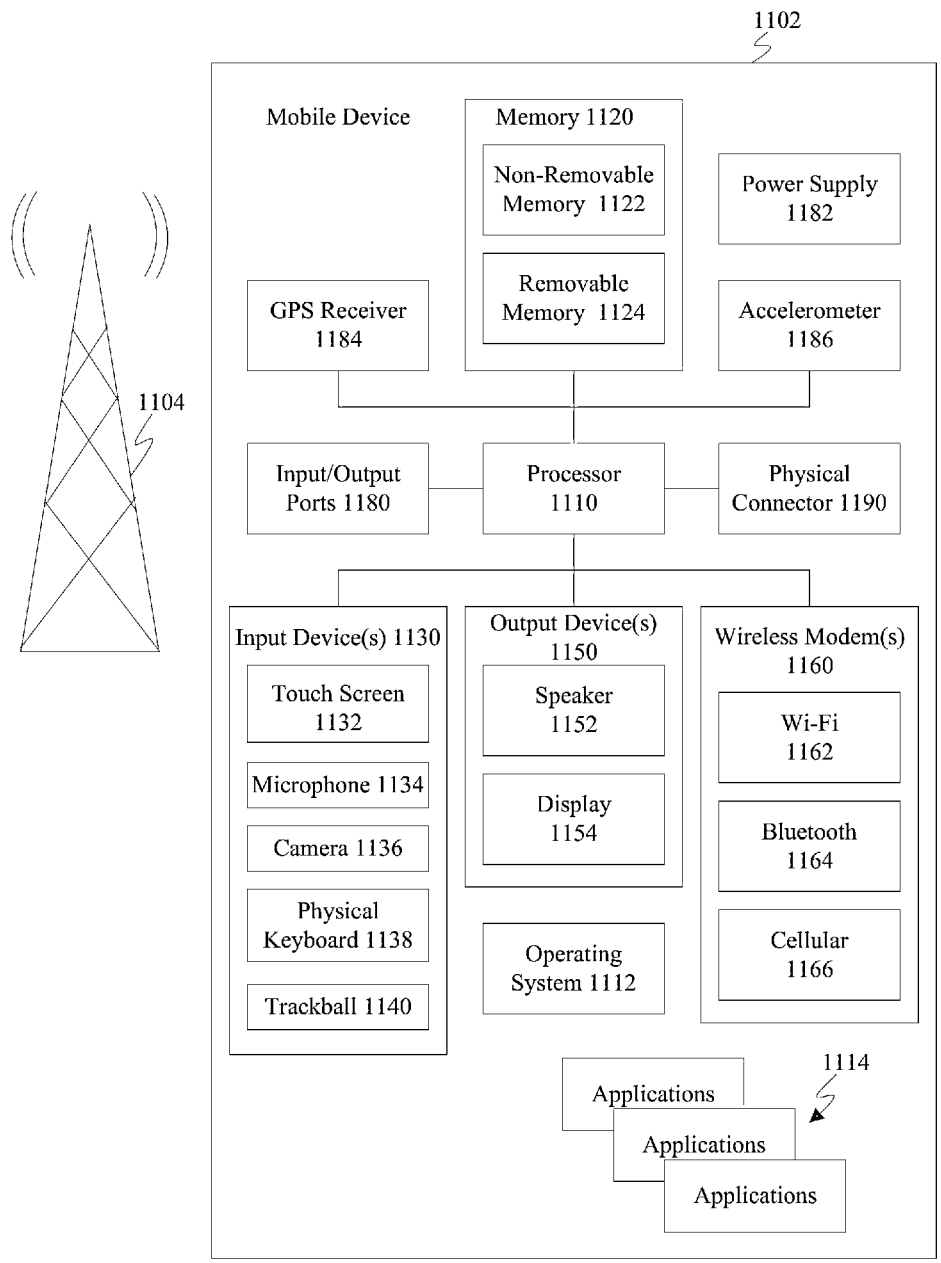

FIG. 11 is a block diagram of an example mobile device that may be used to implement various embodiments.

Figure 12:
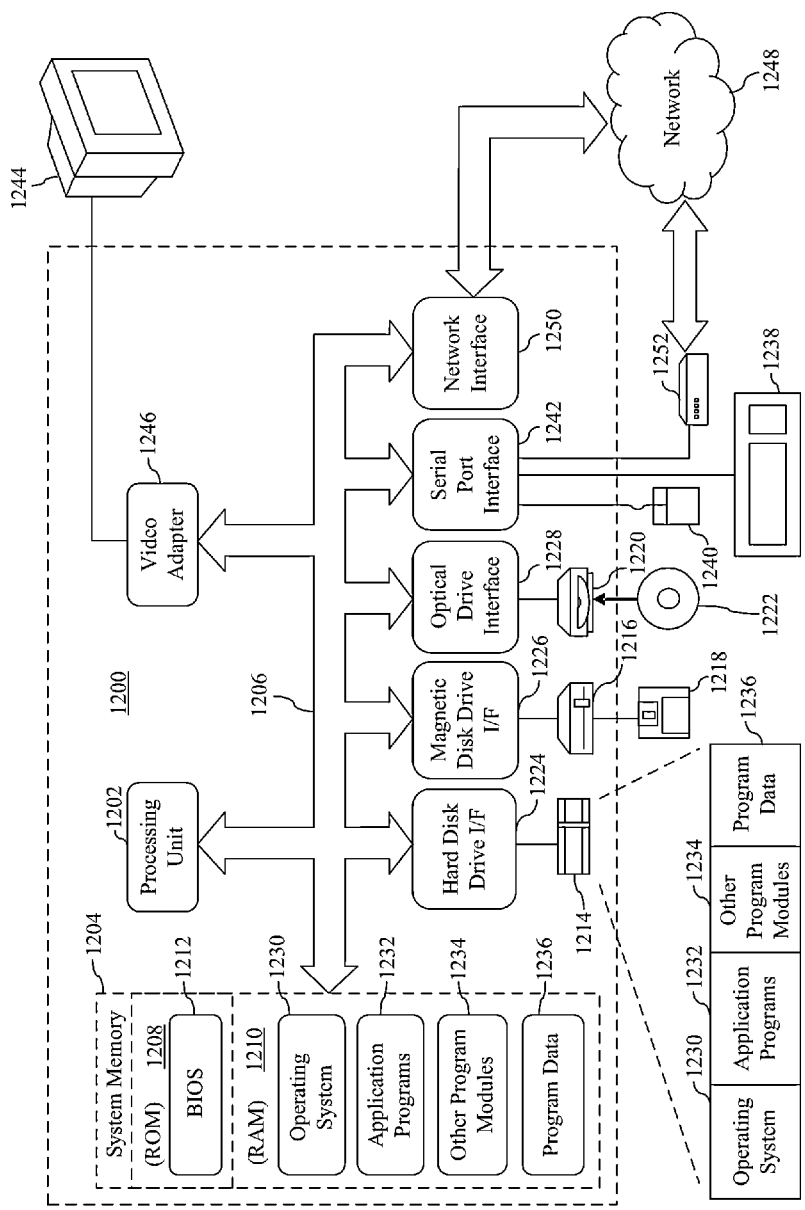

FIG. 12 is a block diagram of an example processor-based computer system that may be used to implement various embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Text enlargement refers to a feature provided by some computers and mobile devices that, when activated, causes text and other display content (e.g., icons) to appear larger without having to change the resolution of the display to which such content is rendered. Text enlargement is generally considered an important accessibility feature as it can be used by people with visual impairments to better enable them to access content displayed by their computers and mobile devices. Text enlargement also provides users with flexibility by enabling them to select their own preferred display size for text.

Text enlargement is typically implemented either by forcing a particular font size on all displayed text or by multiplying all font sizes by a user-selected scale factor and then capping all text at some maximum font size. However, these approaches can negatively impact usability, especially when implemented on smart phones and other devices with small form factors. For example, such approaches can cause text that was already large enough to be legible to nevertheless be enlarged. This unnecessary enlargement may cause other content or functionality to be pushed off the display, thereby reducing the user's access thereto.

The foregoing implementation approaches can also negatively impact the usability of applications in which the size of text itself is used to convey information. By way of example, for certain applications, the relative size of different text items rendered to a display may indicate some sort of hierarchy among the text items (e.g., the largest text items may represent document headers, while the next-largest text items may represent document sub-headers, and so on) or whether underlying functionality is available (e.g., text of one size may represent a link to some other content or functionality, while text of a different size may not). For such applications, forcing all the text to the same font size or multiplying the font sizes by a scale factor up to a maximum font size can cause text items that were originally of a different size to appear to be the same size. As a result, the information that was meant to be conveyed to the user by the relative size of the different text items is lost. This can significantly degrade usability of such applications.

Systems, methods, apparatuses, and computer program products for resizing content to be rendered to a display are described herein. In accordance with embodiments, content items such as text items and images are enlarged based on an original size associated therewith and a scale factor. The enlargement is carried out in a manner such that smaller content items are enlarged as the scale factor increases at a faster rate than a rate at which relatively larger content items are enlarged as the scale factor increases. This approach can improve accessibility by applying a greater degree of enlargement to those content items which are smallest and hardest to read, while improving usability by applying a lesser degree of enlargement to larger content items that may already be sufficiently legible, thereby freeing up more of a display area for other content and functionality a user may wish to access. In a further embodiment, the enlargement is performed in such a manner that the size of smaller content items after enlargement will never equal or exceed the size of relatively larger content items after enlargement. By preserving a size difference between smaller and larger content items even after enlargement has been applied, usability of applications that utilize the size of content itself to convey information can be maintained.

Embodiments described herein may also perform content reduction. In particular, embodiments described herein may perform content reduction in manner such that larger content items are reduced in size at a slower rate as a scale factor decreases than a rate at which relatively smaller content items are reduced in size as the scale factor decreases. Furthermore, embodiments described herein may perform content reduction in such a manner that the size of larger content items after reduction will never equal or be less than the size of relatively smaller content items after reduction.

Section II describes an example system for resizing content to be rendered to a display in accordance with embodiments. Section III describes exemplary methods for resizing content to be rendered to a display in accordance with embodiments. Section IV describes an example mobile device that performs content resizing in accordance with techniques described herein. Section V describes an example desktop computer that performs content resizing in accordance with techniques described herein. Section VI provides some concluding remarks.

II. Example System for Resizing Content to be Rendered to a Display

Figure 1:
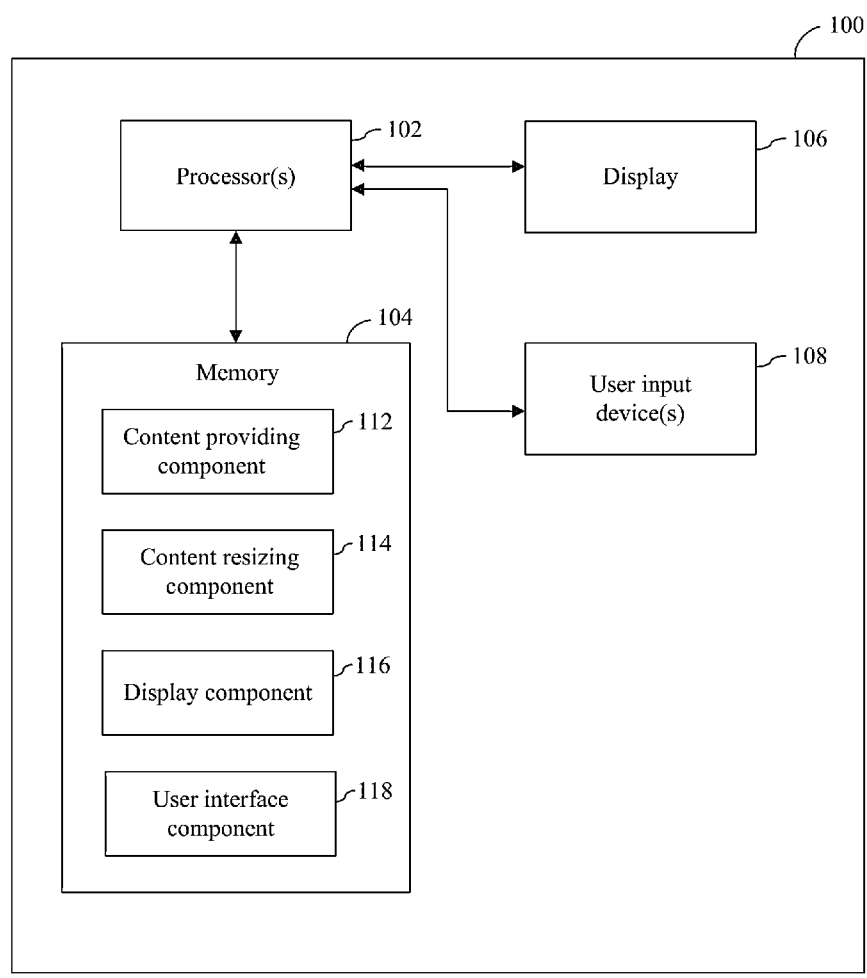
FIG. 1 is a block diagram of a system that resizes content to be rendered to a display in accordance with an embodiment.

FIG. 1 is a block diagram of a system 100 that resizes content to be rendered to a display in accordance with an embodiment. In one embodiment, system 100 is implemented in a mobile device. The mobile device may comprise, for example, a mobile phone (e.g., a smart phone), a laptop computer, a tablet computer, a netbook, a wearable computer such as a smart watch or a head-mounted computer, a portable media player, a handheld game console, a personal digital assistant, a personal navigation assistant, a camera, or any other mobile device capable of displaying text or other types of content. One example of a mobile device that may incorporate the functionality of system 100 will be discussed below in reference to FIG. 11. In another embodiment, system 100 comprises a desktop computing system or other non-mobile system (including, for example, displays for the Internet-of-things) capable of displaying text or other types of content. An example desktop computing system that may incorporate the functionality of system 100 will be discussed below in reference to FIG. 12.

As shown in FIG. 1, system 100 includes a number of interconnected components including one or more processors 102, a memory 104, a display 106 and one or more user input devices 108. Processor(s) 102 are intended to represent one or more microprocessors, each of which may have one or more central processing units (CPUs) or microprocessor cores. Processor(s) 102 operate in a well-known manner to execute computer program logic. The execution of such computer program logic causes processor(s) 102 to perform operations including operations that will be described herein.

Memory 104 comprises one or more computer-readable memory devices that operate to store computer programs (also referred to herein as computer program logic) for execution by processor(s) 102 as well as data associated therewith. Any of a wide variety of volatile and non-volatile computer-readable memory devices may be used to implement memory 104, including but not limited to read-only memory (ROM) devices, random access memory (RAM) devices, solid state drives, hard disk drives, magnetic storage media such as magnetic disks and associated drives, optical storage media such as optical disks and associated drives, and flash memory devices such as USB flash drives. Still other types of computer-readable memory devices may be used to implement memory 104. Moreover, various combinations of different types of computer-readable memory devices may be used to collectively implement memory 104. Memory 104 is connected to and accessible by processor(s) 102 via one or more suitable interfaces.

Display 106 comprises a device to which content, such as text and images, can be rendered so that it will be visible to a user. Some or all of the rendering operations required to display such content may be performed at least in part by processor(s) 102 which is connected to display 106 via a suitable interface. Some or all of the rendering operations may also be performed by a display device interface such as a video or graphics chip or card (not shown in FIG. 1) that is coupled between processor(s) 102 and display 106. Depending upon the implementation of system 100, display 106 may comprise a device that is integrated within the same physical structure or housing as processor(s) 102 and memory 104 or may comprise a monitor, projector, a wearable device (such as glasses or a watch), or other type of device that is physically separate from a structure or housing that includes processor(s) 102 and memory 104 and connected thereto via a suitable wired and/or wireless connection (such as by BLUETOOTH® or other RF communication).

User input device(s) 108 comprise one or more devices that operate to generate user input information in response to a user's manipulation or control thereof. Such user input information is passed via a suitable interface to processor(s) 102 for processing thereof. Depending upon the implementation, user input device(s) 108 may include a touch screen (e.g., a touch screen integrated with display 106), a proximity sensing surface (such as a screen which detects hovering of an object such as a pen or a finger), a keyboard, a keypad, a mouse, a touch pad, a trackball, a joystick, a pointing stick, a wired glove, a motion tracking sensor, a game controller or gamepad, or a video capture device such as a camera. However, these examples are not intended to be limiting and user input device(s) 108 may include other types of devices other than those listed herein. Depending upon the implementation, each user input device 108 may be integrated within the same physical structure or housing as processor(s) 102 and memory 104 (such as an integrated touch screen, touch pad, or keyboard on mobile device) or physically separate from a physical structure or housing that includes processor(s) 102 and memory 104 and connected thereto via a suitable wired and/or wireless connection.

As further shown in FIG. 1, memory 104 stores a number of software components including a content providing component 112, a content resizing component 114, a display component 116, and a user interface component 118. Each of these software components comprises computer program logic that, when executed by processor(s) 102, causes processor(s) 102 to perform certain operations that will be described herein. In the following, when it is stated that a particular one of software components 112, 114, 116 and 118 performs a particular operation or is configured to perform a particular operation, it is to be understood that what is meant is that when the particular software component is executed by processor(s) 102, the particular operation is performed.

Content providing component 112 is intended to broadly represent any software component that is capable of providing content to be rendered to display 106. Such content may include, for example and without limitation, text and/or images. Content providing component 112 may comprise, for example, any of a wide variety of application programs (sometimes referred to as "applications" or "apps"). By way of example only and without limitation, content providing component 112 may comprise any one of a Web browser application, an e-mail application, a messaging application, an e-reader application, a telephony application, a calendar application, a social networking application, a media player application, a navigation application, a weather application, a game application, a contacts or address book application, a photography application, a shopping application, a word processing application, a spreadsheet application, a programming application, or the like. Content providing component 112 may also comprise an operating system or a component thereof, or any other type of software program, module or entity that is capable of providing content to be rendered to display 106.

Content resizing component 114 comprises a software component that may operate to resize (e.g., enlarge or reduce the size of) content items that are provided by content providing component 112 prior to rendering of such content items to display 106. In an embodiment, content resizing component 114 comprises a part of an operating system that is stored in memory 104 and executed by processor(s) 102. However, this is only an example, and content resizing component 114 need not comprise a part of an operating system. For example, content resizing component 114 may comprise a stand-alone program that is not part of an operating system. In another embodiment, content resizing component 114 comprises a part of content providing component 112. Still other implementations are possible as would be recognized by persons skilled in the relevant art(s).

In one embodiment, content resizing component 114 only performs resizing operations in response to user activation of a content resizing feature of system 100. In another embodiment, content resizing component 114 performs content resizing operations automatically without being activated by a user. For example, content resizing component 114 may perform content resizing operations based on one or more automatically-determined parameters. The manner in which content resizing component 114 is activated as well as the manner in which content resizing component performs resizing operations will be discussed in more detail below.

Display component 116 comprises a software component that causes content items that have been provided by content providing component 112 and optionally resized by content resizing component 114 to be rendered to display 106. Like content resizing component 114, display component 116 may also comprise part of an operating system that is stored in memory 104 and executed by processor(s) 102. However, this is only an example, and display component 116 need not comprise a part of an operating system. For example, display component 116 may comprise a stand-alone program that is not part of an operating system. In another embodiment, display component 116 comprises a part of content providing component 112. Still other implementations are possible.

As noted above, content resizing component 114 is configured to perform content enlargement. In one embodiment, content resizing component 114 is configured to increase the size of content items as a user-selected or system-selected scale factor increases. In other words, the larger the scale factor, the more enlargement that is applied to each content item. However, the function used to determine the amount of enlargement that is applied to each content item is based not only on the scale factor but also on a non-linear function of the original size of the content item, which in one embodiment is a logarithm of the original size of the content item.

The effect of this is that as the scale factor is increased, all content items will be enlarged but content items of different original sizes will enlarge at different rates. In particular, as the scale factor increases, content items with smaller original sizes will increase in size at a faster rate than content items with relatively larger original sizes. For example, a text item having an original font size of 12 will increase in size at a faster rate as the scale factor increases than a text item having an original font size of 24. This feature can improve accessibility by applying a greater degree of enlargement to those content items which are smallest and hardest to read, while improving usability by applying a lesser degree of enlargement to larger content items that may already be sufficiently legible, thereby freeing up more of a display area for other content and functionality a user may wish to access.

The aforementioned content enlargement function also ensures that when content enlargement is applied to a first content item and a second content item that is larger than the first content item, that the first content item after enlargement will never be larger than the second content item after enlargement. For example, a text item having an original font size of 12 will always be smaller than a text item having an original font size of 13, 14, 15 or greater, regardless of the amount of enlargement that is applied to each. By preserving a size difference between smaller and larger content items even after enlargement has been applied, this feature can help maintain the usability of applications or other computer programs that utilize the size of content itself to convey information such as structure or hierarchy of information among different sections of the content as discussed in greater detail further herein.

In one embodiment, content resizing component 114 utilizes a content enlargement function that accepts as input a scale factor and the original size of a content item to be enlarged and outputs an enlarged size of the content item to be used for display. For example, the content enlargement function may comprises a stepwise function that first creates a seed value. The seed value is then used to determine the ultimate enlarged content size used for display. This content enlargement function may be implemented as follows:

(1) Given the original size, original_size, of a content item, find the seed $$seed=MAX(-e*\ln(original\_size)+18,0)$$

(2) Given the scale factor, scale_factor, use the original size of the content item and seed to obtain the enlarged content size, enlarged_size:

$$enlarged\_size=(original\_size)+(seed*(scale\_factor-1)).$$

From the foregoing, it can be seen that the amount by which the original size of a content item is enlarged (i.e., the amount that is added to the original size to obtain the enlarged size) may also be represented as:

$$MAX(-e*\ln(original\_size)+18,0)*(scale\_factor-1) \quad (1)$$

The foregoing enlargement function was found through extensive experimentation to provide an optimal tradeoff between accessibility and usability.

In one embodiment, content resizing component 114 exposes an application programming interface (API) by which applications can invoke the content resizing functionality thereof. For example, the API may include a function that can be invoked by an application to determine if content resizing has been turned on (i.e., that indicates whether the content resizing feature is active or inactive). Additionally, the API may include a function that receives an original size associated with a content item (e.g., original_size) and returns an adjusted content size (e.g., enlarged_size) for the content item based on the original size and the currently-selected scale factor (e.g., scale_factor).

In accordance with the foregoing content enlargement function, the scale factor can take on any value starting at 1. A scale factor value of 1 basically means that no content enlargement is applied. In other words, a scale factor value of 1 is a neutral value. However, increasing the scale factor to a value that is greater than 1 will begin to enlarge content on a curve.

Figure 2:
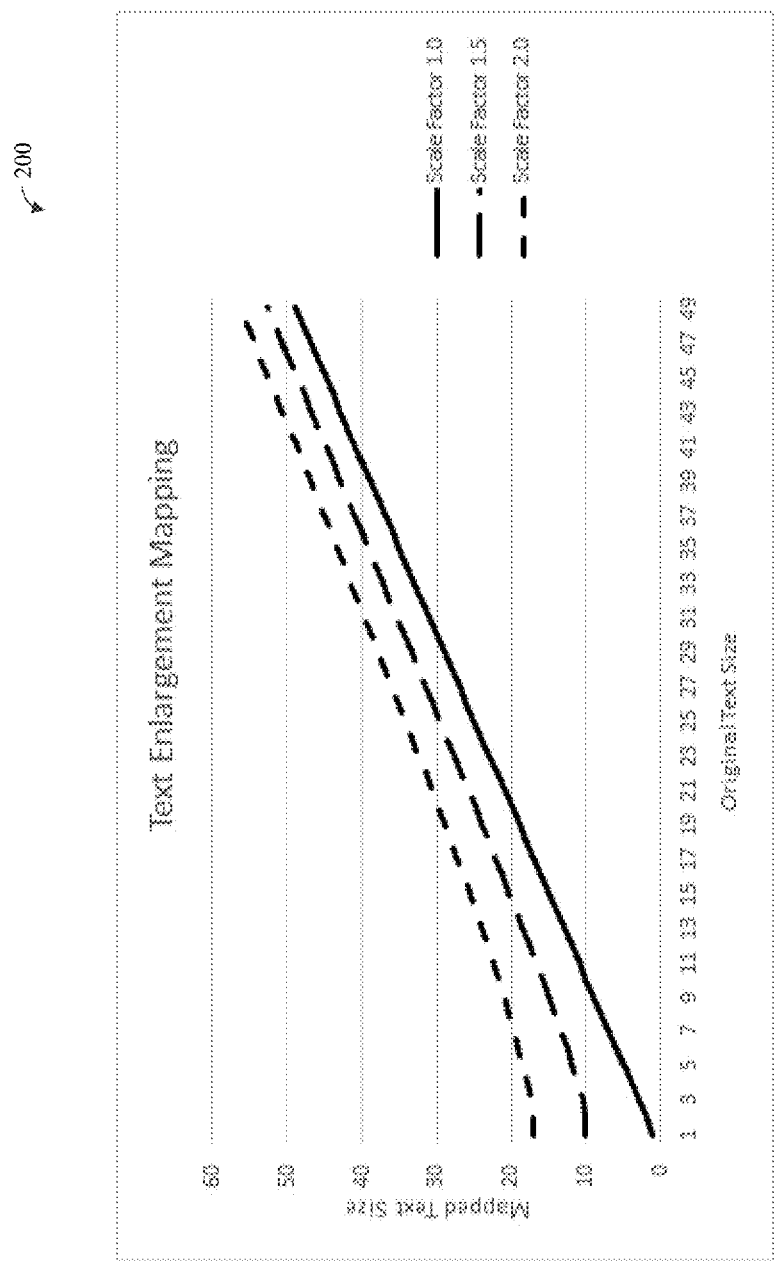
FIG. 2 is a graph that illustrates how text having font sizes 1-50 may be enlarged for scale factors of 1.0, 1.5 and 2.0 in accordance with an embodiment.

This is illustrated by FIG. 2. In particular, FIG. 2 is a graph 200 that illustrates how content resizing component 114 enlarges text items having font sizes 1-50 for scale factors of 1.0, 1.5 and 2.0 in accordance with an embodiment. As can be seen, the larger the scale factor, the larger the text sizes get regardless of the original text size. Scale factor 1 is a neutral value that, given the original text size, will output the same exact text size.

It may not be immediately apparent, but the three lines shown in graph 200 are not exactly parallel. They slowly converge towards a very large text size. The convergence value is not limited since text size can take on very large values, including values very close to infinity. There are no technical limitations on how large text can really be. However, a minimum text size boundary of 1 is observed. Zero and negative text sizes fall outside of the valid range.

As can also be seen in graph 200, for each scale factor, smaller text is enlarged to a greater degree than larger text. For example, when the scale factor is equal to 2, a text item having an original font size of 10 will be enlarged to an approximate font size of 19.24 while text having an original font size of 40 will be enlarged to an approximate font size of 45.78.

FIGS. 3A, 3B and 3C collectively provide a first example of how text that is resized using the foregoing content enlargement technique appears on the display of a smart phone. In particular, FIG. 3A shows how a plurality of different-sized text items appear on a smart phone display 300 when the scale factor equals 1 (i.e., when no enlargement is applied). FIG. 3B shows how the plurality of different-sized text items appear on smart phone display 300 when enlargement in accordance with a scale factor of 1.5 has been applied. FIG. 3C shows how the plurality of different-sized text items appear on smart phone display 300 when enlargement in accordance with a scale factor of 2.0 has been applied.

In FIGS. 3B and 3C, all of the text has been enlarged, although it may be difficult to notice the enlargement of the very large text at the top of display 300. This is because, as the scale factor increases from 1.0 to 1.5 to 2.0, the large text is enlarged at a much slower rate than the smaller text that is located beneath it. In contrast, it is much easier to observe the enlargement of the very small text. For example, in FIG. 3C, the very small text at the bottom of display 300 ("size 10 writing") has almost doubled in size. This is advantageous since the very small text is typically the text that is least legible and thus most in need of enlargement.

FIGS. 3A, 3B and 3C further illustrate that because the content enlargement scheme enlarges text using a curve, there is no need to suppress the enlargement of very large text. Rather, very large text is enlarged but to a much lesser degree than smaller text. This has the benefit of reducing the amount of content or functionality that will be displaced by the enlarged text.

As was noted previously herein, there are many computer programs that use the size of text (or other content) itself to convey information. By way of example, the relative size of different text items rendered to a display may indicate some sort of hierarchy among the text items (e.g., the largest text items may represent document headers, while the next-largest text items may represent document sub-headers, and so on) or whether underlying functionality is available (e.g., text of one size may represent a link to some other content or functionality, while text of a different size may not). For example, the different-sized text items shown in FIG. 3A have a hierarchical visual appearance. FIGS. 3B and 3C illustrate that even after content enlargement has been applied, the enlarged text has retained this hierarchical visual appearance. This is because content enlargement is performed in such a manner that the size of smaller content items after enlargement will never equal or exceed the size of relatively larger content items after enlargement.

FIGS. 4A, 4B and 4C collectively provide a second example of how text that is resized using the foregoing content enlargement technique appears on the display of a smart phone. In particular, FIG. 4A shows how a plurality of different-sized text items associated with a contacts application appear on a smart phone display 400 when the scale factor equals 1 (i.e., when no enlargement is applied). FIG. 4B shows how the plurality of different-sized text items associated with the contacts application appear on smart phone display 400 when enlargement in accordance with a scale factor of 1.5 has been applied. FIG. 4C shows how the plurality of different-sized text items associated with the contacts application appear on smart phone display 400 when enlargement in accordance with a scale factor of 2.0 has been applied.

FIGS. 4A, 4B and 4C further demonstrate how smaller text items are enlarged at a faster rate than relatively larger text items as the scale factor increases and how size differences are maintained. For example, as shown in these figures, the contacts application distinguishes certain interactive text items from certain non-interactive text items by text size. For example, the non-interactive text "call mobile" is distinguished from the interactive text "+1 (425) 555-1234" (which will initiate a phone call when activated by a user) by virtue of the former being larger than the latter. As shown in FIGS. 4B and 4C, even after text enlargement has been applied to both text items, "call mobile" is still visibly larger than "+1 (425) 555-1234." Thus, the distinction between interactive and non-interactive text based on size has been maintained.

FIGS. 5A, 5B and 5C collectively provide a third example of how text that is resized using the foregoing content enlargement technique appears on the display of a smart phone. In particular, FIG. 5A in particular shows how a plurality of different-sized text items associated with an e-mail application appear on a smart phone display 500 when the scale factor equals 1 (i.e., when no enlargement is applied). FIG. 5B shows how the plurality of different-sized text items associated with the e-mail application appear on smart phone display 500 when enlargement in accordance with a scale factor of 1.5 has been applied. FIG. 5C shows how the plurality of different-sized text items associated with the contacts application appear on smart phone display 500 when enlargement in accordance with a scale factor of 2.0 has been applied.

FIGS. 5A, 5B and 5C further demonstrate how smaller text items are enlarged at a faster rate than relatively larger text items as the scale factor increases and how size differences are maintained. For example, as shown in these figures, the e-mail application distinguishes between different types of information associated with an e-mail by text size. For example, a sender of a particular e-mail ("Saied Khanahmadi") is shown using text that is larger than the text used to show the subject line of the same e-mail ("Phone XAML Controls Triage"). Furthermore, the subject line is shown using text that is larger than the text used to show a portion of the body of the same e-mail ("The path for 60454 was changed. Is there a way to . . . "). As shown in FIGS. 5B and 5C, even after text enlargement has been applied to all three text items, the sender is still visibly larger than the subject line and the subject line is still visibly larger than the body. Thus, the distinction between the different types of e-mail information based on size has been maintained.

Furthermore, as can be seen in FIGS. 5A, 5B and 5C, there is no line or other boundary provided to distinguish one e-mail from another. Rather, a separation between e-mails is conveyed by virtue of the very large size of each of the sender names information relative to the smaller items of e-mail information shown below each of the sender names. Because the text enlargement scheme maintains a size difference between the sender name and the other e-mail information, this separation between distinct e-mails is also advantageously maintained.

The ability of the aforementioned content enlargement technique to maintain size differences between various text items even after enlargement has been applied is particularly beneficial for application development platforms where design constraints must be followed that require different types of text items to be displayed using different text sizes. For example, an application development platform may require that font size be used to depict hierarchy.

Although much of the foregoing refers to text enlargement, it is to be understood that content resizing component 114 can be used to enlarge other types of content as well, such as images. Any of a wide variety of images could be enlarged using the foregoing techniques. By way of example only and without limitation, content resizing component 114 could be used to enlarge album covers displayed by a media player application, playing cards displayed by a game application, advertisements displayed by a Web browser, or the like.

One straightforward way to enlarge an image that includes text using the foregoing equations would be to determine a size of the text included in the image. This size is used as the original_size and input into the equations along with the scale_factor. The output size generated by the equation is then divided by the original_size to generate a multiplier. The multiplier could then be applied to the image size to generate an increased image size. However, this is one example only and is not intended to be limiting. Still other techniques and equations may be used to determine an enlarged image size. Furthermore, it is noted that the content resizing techniques described herein can be applied to images that do not include text, provided that an original size can be determined for such images in some manner.

As was previously described, the scale factor used by content resizing component 114 may be selected by a user of system 100. For example, memory 104 may store a user interface component 118 that, when executed by processor(s) 102, displays a user interface on display 106. A user can interact with such user interface to select the scale factor. In an embodiment, user interface component 118 comprises a part of an operating system that is stored in memory 104 and executed by processor(s) 102. However, this is only an example, and user interface component 118 need not comprise a part of an operating system. For example, user interface component 118 may comprise a stand-alone program that is not part of an operating system. In another embodiment, user interface component 118 comprises a part of content providing component 112. Still other implementations are possible. In certain embodiments, user interface component 118 comprises part of a settings tool associated with system 100 that enables a user thereof to activate and control certain accessibility features, although this is only an example.

FIG. 6 is an example of a user interface 600 that may be displayed by user interface component 118 and used to select a scale factor for content resizing. As shown in FIG. 6, user interface 600 includes a slider button 602 and a slider path 604. By dragging slider button 602 to the right along slider path 604, a user can increase the scale factor. Conversely, by dragging slider button 602 to the left along slider path 604, a user can reduce the scale factor. In an embodiment in which user input device(s) 108 comprise a touch screen, a user may achieve such dragging of slider button 602 by sliding his/her finger to the right or left across the touch screen. However, it is to be understood that any of a wide variety of known user input device(s) may be used to interact with slider button 602. As the user manipulates slider button 602 to select a scale factor, the size of a text sample 608 that is displayed within a window 606 of user interface 600 is modified accordingly, thereby providing a visible example of how an item of text will appear using the currently-selected scale factor.

In one embodiment, slider button 602 may be used to select one of four incrementally-increasing scale factor values, with the smallest scale factor being 1 (i.e., no content resizing). However, this example is not intended to be limiting, and slider button 602 may be used to select any number of incrementally-increasing scale factor values. Indeed, the scale factor value may be controlled to a very fine resolution using slider button 602.

Although user interface 600 comprises a slider mechanism to enable a user to select a scale factor, persons skilled in the relevant art(s) will appreciate that a wide variety of other user interface mechanisms may be used to perform the same function. For example, in an embodiment in which user input device(s) 108 include a touch screen, pinch and zoom gestures may be applied directly to content that a user wishes to resize (or to an area in which such content is displayed) to cause the scale factor to be reduced or increased, and to adjust the content size accordingly. However, this is merely one example.

In alternate embodiments, the scale factor may be selected automatically by an operating system or other software component stored in memory 104 and executed by processor(s) 102. In accordance with such embodiments, system 100 will automatically resize content without requiring a user to activate resizing functionality and/or select a scale factor. Such automated selection of the scale factor may be performed by a scale factor selection component stored in memory 104 and executed by processor(s) 102. The selection may be based on one or more parameters. Such parameters may include, for example and without limitation, one or more of a size of display 106, a resolution of display 106, an operating mode of a device that includes system 100, a location or orientation of a user with respect to display 106 or a device that includes system 100, a manufacturer of a device that includes system 100, or a model of a device that includes system 100.

By selecting the scale factor in an automated fashion, an embodiment of system 100 can automatically select an optimal content resizing strategy for a given device and/or viewing scenario without requiring user input. Furthermore, such a feature can enable developers to program applications for execution on different platforms without having to worry about sizing application display content for each platform. Instead, the system can select the best content resizing strategy for a given application depending upon what platform the application is being executed upon.

Although the foregoing describes how content resizing component 112 performs content enlargement, it is to be understood that content resizing component 112 may also perform content reduction. In particular, content resizing component 112 may perform content reduction in manner such that larger content items are reduced in size at a slower rate as a scale factor decreases than a rate at which relatively smaller content items are reduced in size as the scale factor decreases. Furthermore, content resizing component may perform content reduction in such a manner that the size of larger content items after reduction will never equal or be less than the size of relatively smaller content items after reduction.

It is possible that there may be applications for which the foregoing content resizing technique is unsuitable. For example, it may be considered undesirable to apply the foregoing content resizing technique to tag clouds in which the size of different text items imply a relative importance attached to each. By resizing different-sized text items at different rates as the scaling factor increases or decreases, the original information meant to be conveyed by the size of such text could be distorted. Thus, in one embodiment, user interface component 118 is configured to provide a user interface by which a user can cause content resizing component 114 to operate in an alternate mode in which all text is enlarged or reduced at the same rate as the scaling factor increases or decreases respectively. Such alternate mode could also be invoked by system 100 based on one or more automatically-determined factors.

III. Example Methods for Resizing Content to be Rendered to a Display

FIG. 7 depicts a flowchart 700 of a method for enlarging a content item to be rendered to a display in accordance with an embodiment. The method of flowchart 700 may be performed, for example, by one or more components of system 100 as described above in reference to FIG. 1. However, the method is not limited to that embodiment.

As shown in FIG. 7, the method of flowchart 700 begins at step 702 in which a scale factor is received. At step 704, an original size associated with a content item to be displayed is received. The content item may comprise, for example, a text item or an image.

At step 706, an enlargement amount is calculated as a function of the scale factor and the original size. The function is defined such that, for a fixed scale factor, the enlargement amount decreases as the original size increases. In one embodiment, calculating the enlargement amount in this fashion comprises calculating the enlargement amount as a function of the scale factor and a natural logarithm of the original size. In further accordance with this example, the enlargement amount may be calculated using the function described above in Equation 1, such that the enlargement amount is calculated in accordance with $$\mathrm{MAX}(-e*\ln(\mathrm{original\_size})+18,0)*(\mathrm{scale\_factor}-1)$$

wherein original_size represents the original size of the content item and scale_factor represents the scale factor.

At step 708, the enlargement amount is added to the original size thereby producing an output size and, at step 710, the content item is caused to be displayed at the output size.

In one embodiment, steps 702, 704, 706 and 708 are performed by content resizing component 114 as described above in reference to system 100 of FIG. 1 and step 710 is performed by display component 116 as described above in reference to system 100 of FIG. 1.

FIG. 8 depicts a flowchart 800 of a method for enlarging first and second content items to be rendered to a display in accordance with an embodiment. The method of flowchart 800 may be performed, for example, by one or more components of system 100 as described above in reference to FIG. 1. However, the method is not limited to that embodiment.

As shown in FIG. 8, the method of flowchart 800 begins at step 802 in which a respective size associated with each of a first content item and a second content item is obtained. The size of the first content item is different than the size of the second content item. The first content item and the second content item may comprise, for example, two text items, two images, or a text item and an image respectively.

At step 804, the respective size associated with each of the first and second content items is increased as a scale factor increases, such that the size associated with the smaller of the first and second content items increases with the scaling factor at a rate that is faster than a rate at which the size associated with a larger of the first and second content items increases with the scaling factor.

At step 806, the first and second content items are caused to be displayed at the increased sizes respectively associated therewith.

In one embodiment, steps 802 and 804 are performed by content resizing component 114 as described above in reference to system 100 of FIG. 1 and step 806 is performed by display component 116 as described above in reference to system 100 of FIG. 1.

FIG. 9 depicts a flowchart 900 of a method for reducing first and second content items to be rendered to a display in accordance with an embodiment. The method of flowchart 900 may be performed, for example, by one or more components of system 100 as described above in reference to FIG. 1. However, the method is not limited to that embodiment.

As shown in FIG. 9, the method of flowchart 900 begins at step 902 in which a respective size associated with each of a first content item and a second content item is obtained. The size of the first content item is different than the size of the second content item. The first content item and the second content item may comprise, for example, two text items, two images, or a text item and an image respectively.

At step 904, the respective size associated with each of the first and second content items is reduced as a scale factor decreases, such that the size associated with the smaller of the first and second content items decreases with the scaling factor at a rate that is slower than a rate at which the size associated with a larger of the first and second content items decreases with the scaling factor.

At step 906, the first and second content items are caused to be displayed at the decreased sizes respectively associated therewith.

In one embodiment, steps 902 and 904 are performed by content resizing component 114 as described above in reference to system 100 of FIG. 1 and step 906 is performed by display component 116 as described above in reference to system 100 of FIG. 1.

FIG. 10 depicts a flowchart 1000 of another method for enlarging first and second content items to be rendered to a display in accordance with an embodiment. The method of flowchart 1000 may be performed, for example, by one or more components of system 100 as described above in reference to FIG. 1. However, the method is not limited to that embodiment.

As shown in FIG. 10, the method of flowchart 1000 begins at step 1002, in which an original size associated with a first content item is received. At step 1004, an original size associated with a second content item is received. The original size associated with the first content item is different than the original size associated with the second content item. The first content item and the second content item may comprise, for example, two text items, two images, or a text item and an image respectively.

At step 1006, an enlargement amount is calculated for the first content item and an enlargement amount is calculated for the second content item. The enlargement amount for each content item is calculated utilizing a function of the original size associated with the respective content item and a scale factor. The function is defined such that the enlargement amount for the smaller of the first and second content items increases with the scale factor at a rate that is faster than a rate at which the enlargement amount for the larger of the first and second content items increases with the scale factor.

In one embodiment, the enlargement amount for each of the first and second content items is calculated in accordance with $$MAX(-e*\ln(\text{original\_size})+18,0)*(\text{scale\_factor}-1)$$

wherein original_size represents the original size of the first or second content item respectively and scale_factor represents the scale factor.

At step 1008, the enlargement amount for the first content item is added to the original size associated with the first content item to produce an output size associated with the first content item.

At step 1010, the enlargement amount for the second content item is added to the original size associated with the second content item to produce an output size associated with the second content item.

At step 1012, the first content item is displayed at the output size associated with the first content item.

At step 1014, the second content item is displayed at the output size associated with the second content item.

In one embodiment, steps 1002, 1004, 1006, 1008 and 1010 are performed by content resizing component 114 as described above in reference to system 100 of FIG. 1 and steps 1012 and 1014 are performed by display component 116 as described above in reference to system 100 of FIG. 1.

In a further embodiment, the method of flowchart 1000 further includes selecting the scale factor based on user input. Alternatively, the method of flowchart 1000 may further include the step of selecting the scale factor based on one or more parameters. The one or more parameters may include, for example and without limitation, one or more of a display size, a display resolution, a device operating mode, a user viewing location or orientation, a device manufacturer, and a device model.

IV. Example Mobile Device Implementation

FIG. 11 is a block diagram of an exemplary mobile device 1102 that may implement embodiments described herein. As shown in FIG. 11, mobile device 1102 includes a variety of optional hardware and software components. Any component in mobile device 1102 can communicate with any other component, although not all connections are shown for ease of illustration. Mobile device 1102 can be any of a variety of computing devices (e.g., cell phone, smartphone, handheld computer, Personal Digital Assistant (PDA), etc.) and can allow wireless two-way communications with one or more mobile communications networks 1104, such as a cellular or satellite network, or with a local area or wide area network.

The illustrated mobile device 1102 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components of mobile device 1102 and support for one or more application programs 1114 (also referred to as "applications" or "apps"). Application programs 114 may include common mobile computing applications (e.g., e-mail applications, calendars, contact managers, Web browsers, messaging applications) and any other computing applications (e.g., word processing applications, mapping applications, media player applications).

The illustrated mobile device 1102 can include memory 1120. Memory 1120 can include non-removable memory 1122 and/or removable memory 1124. Non-removable memory 1122 can include RAM, ROM, flash memory, a hard disk, or other well-known memory devices or technologies. Removable memory 1124 can include flash memory or a Subscriber Identity Module (SIM) card, which is well known in GSM communication systems, or other well-known memory devices or technologies, such as "smart cards." Memory 1120 can be used for storing data and/or code for running operating system 1112 and applications 1114. Example data can include Web pages, text, images, sound files, video data, or other data to be sent to and/or received from one or more network servers or other devices via one or more wired or wireless networks. Memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 1102 can support one or more input devices 1130, such as a touch screen 1132, a microphone 1134, a camera 1136, a physical keyboard 1138 and/or a trackball 1140 and one or more output devices 1150, such as a speaker 1152 and a display 1154. Touch screens, such as touch screen 1132, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens.

Other possible output devices (not shown) can include piezoelectric or other haptic output devices. Some devices can serve more than one input/output function. For example, touch screen 1132 and display 1154 can be combined in a single input/output device. The input devices 1130 can include a Natural User Interface (NUI).

Wireless modem(s) 1160 can be coupled to antenna(s) (not shown) and can support two-way communications between the processor 1110 and external devices, as is well understood in the art. The modem(s) 1160 are shown generically and can include a cellular modem 1166 for communicating with the mobile communication network 1104 and/or other radio-based modems (e.g., Bluetooth 1164 and/or Wi-Fi 1162). At least one of the wireless modem(s) 1160 is typically configured for communication with one or more cellular networks, such as a GSM network for data and voice communications within a single cellular network, between cellular networks, or between the mobile device and a public switched telephone network (PSTN).

Mobile device 1102 can further include at least one input/output port 1180, a power supply 1182, a satellite navigation system receiver 1184, such as a Global Positioning System (GPS) receiver, an accelerometer 1186, and/or a physical connector 1190, which can be a USB port, IEEE 1394 (FireWire) port, and/or RS-232 port. The illustrated components of mobile device 1102 are not required or all-inclusive, as any components can be deleted and other components can be added as would be recognized by one skilled in the art.

In an embodiment, certain components of mobile device 1102 are configured to perform the content resizing techniques described in preceding sections. For example, in one embodiment, the content resizing techniques may be implemented by any one of applications 1114, by operating system 1112, or any one of applications 1114 operating in conjunction with operating system 1112. In accordance with a particular non-limiting example, any one of applications 1114 may perform the functions of content providing component 112 as described above in reference to system 100 of FIG. 1 and operating system 1112 may perform the functions of content resizing component 114, display component 116, and user interface component 118 as described above in reference to system 100 of FIG. 1. However, this is only an example and different functions may be performed by different components. Resized content may be rendered to display 1154. Furthermore, input device(s) 1130 may be used to activate the content resizing functionality and to select a scale factor.

Computer program logic for performing the content resizing techniques described above may be stored in memory 1120 and executed by processor 1110. By executing such computer program logic, processor 1110 may be caused to implement any of the features of any of the components of system 100 as described above in reference to FIG. 1. Also, by executing such computer program logic, processor 1110 may be caused to perform any or all of the steps of flowchart 700 as described above in reference to FIG. 7, flowchart 800 as described above in reference to FIG. 8, flowchart 900 as described above in reference to FIG. 9, and flowchart 1000 as described above in reference to FIG. 10.

V. Example Computer System Implementation

FIG. 12 depicts an example processor-based computer system 1200 that may be used to implement various embodiments described herein. For example, system 1200 may be used to implement any of the components of system 100 as described above in reference to FIG. 1. System 1200 may also be used to implement any of the steps of flowchart 700 as described above in reference to FIG. 7, flowchart 800 as described above in reference to FIG. 8, flowchart 900 as described above in reference to FIG. 9, and flowchart 1000 as described above in reference to FIG. 10. The description of system 1200 provided herein is provided for purposes of illustration, and is not intended to be limiting. Embodiments may be implemented in further types of computer systems, as would be known to persons skilled in the relevant art(s).

As shown in FIG. 12, system 1200 includes a processing unit 1102, a system memory 1204, and a bus 1206 that couples various system components including system memory 1204 to processing unit 1202. Processing unit 1202 may comprise one or more microprocessors or microprocessor cores. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

System 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, BLU-RAY™ disk or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1230, one or more application programs 1232, other program modules 1234, and program data 1236. In accordance with various embodiments, the program modules may include computer program logic that is executable by processing unit 1202 to perform any or all of the functions and features of system 100 as described above in reference to FIG. 1. The program modules may also include computer program logic that, when executed by processing unit 1202, performs any of the steps or operations shown or described in reference to flowchart 700 of FIG. 7, flowchart 800 of FIG. 8, flowchart 900 of FIG. 9, or flowchart 1000 of FIG. 10.

A user may enter commands and information into system 1200 through input devices such as a keyboard 1238 and a pointing device 1240. Other input devices (not shown) may include a microphone, joystick, game controller, scanner, or the like. In one embodiment, a touch screen is provided in conjunction with a display 1244 to allow a user to provide user input via the application of a touch (as by a finger or stylus for example) to one or more points on the touch screen. These and other input devices are often connected to processing unit 1202 through a serial port interface 1242 that is coupled to bus 1206, but may be connected by other interfaces, such as a parallel port, game port, or a universal serial bus (USB). Such interfaces may be wired or wireless interfaces.

A display 1244 is also connected to bus 1206 via an interface, such as a video adapter 1246. In addition to display 1244, system 1200 may include other peripheral output devices (not shown) such as speakers and printers.

System 1200 is connected to a network 1248 (e.g., a local area network or wide area network such as the Internet) through a network interface or adapter 1250, a modem 1252, or other suitable means for establishing communications over the network. Modem 1252, which may be internal or external, is connected to bus 1206 via serial port interface 1242.

As used herein, the terms "computer program medium," "computer-readable medium," and "computer-readable storage medium" are used to generally refer to memory devices or storage structures such as the hard disk associated with hard disk drive 1214, removable magnetic disk 1218, removable optical disk 1222, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1232 and other program modules 1234) may be stored on the hard disk, magnetic disk, optical disk, ROM, or RAM. Such computer programs may also be received via network interface 1250, serial port interface 1242, or any other interface type. Such computer programs, when executed or loaded by an application, enable computer 1200 to implement features of embodiments of the present invention discussed herein. Accordingly, such computer programs represent controllers of the system 1200.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1200 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

VI. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An apparatus, comprising:
    at least one processor; and
    a memory that stores computer program logic for execution by the at least one processor, the computer program logic including a plurality of components configured to perform operations when executed by the at least one processor, the plurality of components including:
        a content-providing component that is configured to provide a first content item and a second content item to be concurrently rendered to a display;
        a content resizing component that is configured to increase a respective size associated with each of the first content item and the second content item based on a curvilinear function of an original size of the first content item and an original size of the second content item as scale factor increases through different values that are greater than one, the original size of the first content item being different than the original size of the second content item, the increase being performed such that the size associated with the smaller of the first and second content items increases with the scale factor at a rate that is faster than a rate at which the size associated with a larger of the first and second content items increases with the scale factor; and
        a display component that causes the first content item and the second content items to be concurrently displayed at the increased sizes respectively associated therewith.

2. The apparatus of claim 1, wherein the first content item and the second content item comprise:
    two text items;
    two images; or
    a text item and an image respectively.

3. The apparatus of claim 1, wherein the plurality of components further include:
    a user interface component that is configured to enable a user of the apparatus to select the scale factor.

4. The apparatus of claim 1, wherein the user interface component is configured to display an interactive slider by which a user of the apparatus can select the scale factor.

5. The apparatus of claim 1, wherein the plurality of components further include:
    a scale factor selection component that is configured to automatically select the scale factor based on one or more of a display size, a display resolution, a device operating mode, a user viewing location or orientation, a device manufacturer, and a device model.

6. The apparatus of claim 1, wherein the content resizing component comprises part of an operating system stored in the memory.

7. The apparatus of claim 1, wherein the content providing component comprises part of an application stored in the memory.

8. The apparatus of claim 1, wherein the content resizing component is accessible to other components via an application programming interface (API).

9. The apparatus of claim 8, wherein the API includes:
    a function that receives a size associated with a content item and returns an adjusted size for the content item.

10. The apparatus of claim 9, wherein the API further includes:
    a function that indicates whether a content resizing feature is active or inactive.

11. The apparatus of claim 1, wherein the content resizing component is further configured to reduce a respective size associated with each of the first content item and the second content item as the scale factor decreases, the decreasing being performed such that the size associated with the smaller of the first and second content items decreases with the scale factor at a rate that is slower than a rate at which the size associated with a larger of the first and second content items decreases with the scale factor.

12. The apparatus of claim 1, wherein the content resizing component is configured to operate in an alternate mode in which the content resizing component increases a respective size associated with each of the first content item and the second content item as the scale factor increases, the increase being performed such that the size associated with the smaller of the first and second content items increases with the scale factor at a rate that is equal to a rate at which the size associated with a larger of the first and second content items increases with the scale factor.

13. A method for performing content resizing, comprising:
    receiving an original size associated with a first content item to be displayed concurrently with a second content item;
    receiving an original size associated with the second content item, the original size associated with the second content item being different than the original size associated with the first content item;
    calculating an enlargement amount for the first content item and an enlargement amount for the second content item by utilizing a curvilinear function of the original size associated with the respective content item and a scale factor, the function being defined such that the enlargement amount for the smaller of the first and second content items increases with the scale factor at a rate that is faster than a rate at which the enlargement amount for the larger of the first and second content items increases with the scale factor through different values that are greater than one; and
    adding the enlargement amount for the first content item to the original size associated with the first content item to produce an output size associated with the first content item;
    adding the enlargement amount for the second content item to the original size associated with the second content item to produce an output size associated with the second content item;
    concurrently displaying the first content item at the output size associated with the first content item and displaying the second content item at the output size associated with the second content item.

14. The method of claim 13, wherein the first content item and the second content item comprise:
    two text items;
    two images; or
    a text item and an image respectively.

15. The method of claim 13, wherein the enlargement amount for each of the first and second content items is calculated in accordance with:
    $MAX(-e * \ln(original\_size) + 18, 0) * (scale\_factor - 1)$;
    wherein original_size represents the original size of the first or second content item respectively and scale_factor represents the scale factor.

16. The method of claim 13, further comprising:
    selecting the scale factor based on user input.

17. The method of claim 13, further comprising:
    selecting the scale factor based on one or more of:
    a display size;
    a display resolution;

a device operating mode;

a user viewing location or orientation;

a device manufacturer; and a device model.

18. A computer program product comprising a computer-readable memory device having instructions recorded thereon that, when executed by one or more processors, cause the one or more processors to perform operations including:

receiving an original size associated with a first content item to be displayed concurrently with a second content item;

receiving an original size associated with the second content item, the original size associated with the second content item being different than the original size associated with the first content item;

calculating an enlargement amount for the first content item and an enlargement amount for the second content item by utilizing a curvilinear function of the original size associated with the respective content item and a scale factor, the function being defined such that the enlargement amount for the smaller of the first and second content items increases with the scale factor at a rate that is faster than a rate at which the enlargement amount for the larger of the first and second content items increases with the scale factor through different values that are greater than one; and adding the enlargement amount for the first content item to the original size associated with the first content item to produce an output size associated with the first content item;

adding the enlargement amount for the second content item to the original size associated with the second content item to produce an output size associated with the second content item; concurrently displaying the first content item at the output size associated with the first content item and the second content item at the output size associated with the second content item.

19. The computer program product of claim 18, wherein the first content item and the second content item comprise:

two text items;

two images; or a text item and an image respectively.

20. The computer program product of claim 18, wherein the enlargement amount for each of the first and second content items is calculated in accordance with:

MAX(-$e$ * ln(original_size) +18, 0) * (scale_factor -1);

wherein original_size represents the original size of the first or second content item respectively and scale_factor represents the scale factor.

* * * * *